United States Patent [19]
Shtayer et al.

[11] Patent Number: 5,414,701
[45] Date of Patent: May 9, 1995

[54] METHOD AND DATA STRUCTURE FOR PERFORMING ADDRESS COMPRESSION IN AN ASYNCHRONOUS TRANSFER MODE (ATM) SYSTEM

[75] Inventors: Ronen Shtayer, Tel Aviv; Roni Eliyahu, Ramat-Gan; Aviel Livay, Holon, all of Israel

[73] Assignee: Motorola, Inc., Schaumburg, Ill.

[21] Appl. No.: 279,140

[22] Filed: Jul. 22, 1994

[51] Int. Cl.6 .............................. H04Q 11/04
[52] U.S. Cl. .................. 370/58.2; 370/60; 370/60.1; 370/79; 370/94.1
[58] Field of Search ............ 370/58.2, 79, 60, 94.1, 370/60.1, 58.1

[56] References Cited

U.S. PATENT DOCUMENTS

| | | | |
|---|---|---|---|
| 5,271,010 | 12/1993 | Miyake et al. | 370/94.1 |
| 5,293,379 | 3/1994 | Carr | 370/94.1 |
| 5,323,389 | 6/1994 | Bitz et al. | 370/60.1 |

*Primary Examiner*—Douglas W. Olms
*Assistant Examiner*—Russell W. Blum

[57] ABSTRACT

An asynchronous transfer mode (ATM) address compression method uses a PHY ID (14). The PHY ID (14) is provided before the transmission of a 53-byte ATM data cell (12, 16, and 18). The PHY ID (14) (also referred to as a link) is used to access a link table (20). The link table (20) contains address compression mode information which allows for many address compression modes and an enable bit, an address pointer, and a mask value which are used to both reduce ATM addressing bits and identify a virtual path table/entry in the ATM system. In some address compression modes, the identified virtual path contains the ingress connection identifier (ICI) which identifies a physical data routing path in the ATM system. In other address compression modes, further address compression of virtual channel identifiers is required beyond the virtual path tables in order to identify a virtual channel table/entry which then contains the ICI.

25 Claims, 4 Drawing Sheets

LE: LINK ENABLE
VPV: VP VALID
VCV: VC VALID
ACM: ADDRESS COMPRESSION MODE

METHOD AND DATA STRUCTURE FOR PERFORMING ADDRESS COMPRESSION IN AN ASYNCHRONOUS TRANSFER MODE (ATM) SYSTEM

FIELD OF THE INVENTION

The present invention relates generally to data processing systems, and more particularly, to address compression in an asynchronous transfer mode (ATM) system.

BACKGROUND OF THE INVENTION

A typical asynchronous transfer mode (ATM) system provides for virtual path connections addressed by a 12-bit virtual path identifier (VPI) and virtual channel connections addressed by the VPI together with a 16-bit virtual channel identifier (VCI). Typically, virtual paths are large collections of various individual virtual channels. For example, one virtual path may contain hundreds of virtual channels. In many communication systems which involve ATM, the 12-bit VPI and 16-bit VCI are too large and cumbersome since there is no need for 4096 virtual paths and 65,536 virtual channels per virtual path. If memory and switching/control information is statically assigned for all possible connections 268,435,456 (4096×65,536) a large amount of memory is needed and wasted. In many cases only tens or hundreds of paths and connections are required.

At each ATM switch used for communication of data, a table of switching and control information must be maintained. Typically, in practice, the number of active connections on a typical 155.52 Mb/sec physical link is not expected to exceed 4,000 connections. Thus, the active portion of the switching information table is not required to be very large. However, in order to exploit the limited size of the number of active connections, a method to compress the 256 Meg possible virtual connections into a much lesser number active connections in a switching information table.

Clearly, using the full 28-bit VPI and VCI as an index to the switching information table is impractical for most applications and extremely inefficient and expensive. Using 256 Meg of memory for 4K active connections is a large waste of resources. Even indirect mapping for 256 Meg entries is impractical.

SUMMARY OF THE INVENTION

The previously mentioned disadvantages are overcome and other advantages achieved with the present invention. In one form, the present invention comprises a method for address compression in an asynchronous transfer mode (ATM) system. The method begins by providing a link identifier to an ATM system and providing a virtual path identifier to the ATM system. The link identifier is used to access one link table entry in a link table wherein the link table entry comprises a virtual path mask and a virtual path pointer. The virtual path pointer is used to access one virtual path table out of a plurality of virtual path tables. A virtual path index is formed by masking the virtual path identifier with the virtual path mask. The virtual path index is used to access a selected virtual path entry in the one virtual path table. An ingress connection identifier is accessed by using the selected virtual path entry.

In another form, the invention comprises a method for address compression in an asynchronous transfer mode (ATM) system. The method begins by providing a serial stream of ATM bytes to an ATM system, extracting a physical layer identifier from the serial stream of ATM bytes, extracting a virtual path identifier from the serial stream of ATM bytes, and extracting a virtual connection identifier from the serial stream of ATM bytes. The physical layer identifier is used as an index into a plurality of entries in a link table. An entry in the link table is used to access a selected one virtual path table out of a plurality of virtual path table stored in memory. The virtual path identifier is used to index into the selected one virtual path table to identify a selected one entry in the selected one virtual path table. A virtual channel offset is extracted from the selected one entry. The virtual channel offset and the virtual connection identifier are used to access a selected one virtual channel table entry in a selected one virtual channel table out of a plurality of virtual channel tables. An ingress connection/channel identifier is extracted from the selected one virtual channel table entry.

In yet another form, the invention comprises a data structure for performing address compression in an asynchronous transfer mode (ATM) system. The data structure has a link array where the link array contains a plurality of entries. One of the entries is accessed for each incoming ATM data cell and each entry in the plurality of entries has a virtual path pointer. The data structure has a plurality of virtual path tables wherein each virtual page pointer in the link array is used to address a unique one virtual path table in the plurality of virtual path tables. Each virtual page table in the plurality of virtual path tables comprises at least one virtual path entry. The at least one virtual path entry comprises a virtual channel pointer. The data structure also comprises a plurality of virtual channel tables wherein each virtual channel pointer in the plurality of virtual path tables is used to address a unique one virtual channel table in the plurality of virtual channel tables. The unique one virtual channel table comprises a plurality of entries wherein one of the entries in the plurality of entries comprises an ingress connection/channel identifier for routing ATM data in the asynchronous transfer mode (ATM) system.

The present invention will be more clearly understood from the detailed description below in conjunction with the accompanying drawings.

Figure 1:
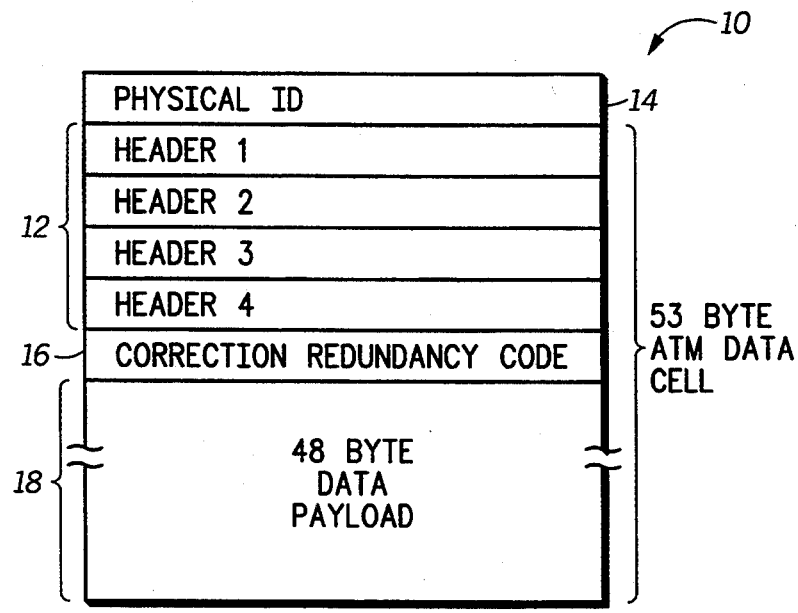
FIG. 1 illustrates, in a block diagram, an asynchronous transfer mode (ATM) data cell in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

The asynchronous transfer mode (ATM) standards allow for the possibility of using a restricted address space and allow the individual developers the option of implementing restricted address space methods. Provided herein is a method for restricting or compressing the address space accessible by an asynchronous transfer mode (ATM) system for the purposes of reduced cost, increased efficiency, and the like. The asynchronous transfer mode (ATM) standard allows for a connection between asynchronous transfer mode (ATM) entities which comprise paths and channels. These paths and channels are referred to more specifically as virtual paths and virtual channels. One virtual path may contain several virtual channels and several virtual paths may exist between ATM entities. The current standard allows for 4096 virtual paths (indexed by a 12-bit virtual path identifier (VPI)) and 65,536 virtual channels (indexed by a 16-bit virtual connection identifier (VCI)) per virtual path which results in 268,435,456 (4096 ×65,536) possible virtual connections between entities or switching nodes. The ATM system must keep switching and control information for all 268,435,456 is all 268,435,456 connections are allowed.

In practice, although 268,435,456 connections are allowed in the ATM standard, rarely are more than 4000 active connections are being used or are available at one given time. Therefore, to store and maintain a 268,435,456 location or more memory table is very wasteful, costly, and inefficient. In other words, when ATM entities at both ends of a physical link agree, the number of allocated bits of the VCI and VPI may be reduced thereby reducing the number of total virtual connections possible. Due to the current practical need for much less than 268,435,456 connections, a more efficient and smaller switching/control table may be created at the expense of sacrificing address assignment flexibility. This shrinking of the switching/control table to achieve a reduced cost, increased efficiency system is described herein by performing masked address compression on the virtual path identifier (VPI) and the virtual channel identifier (VCI) in an asynchronous transfer mode (ATM) system.

Another practical problem is that the number of virtual channels per virtual path is not constant between two ATM entities it is very possible that one user may require 2500 virtual connections using a single virtual path whereas another user between the same two entities requires 600 virtual paths, each with two virtual channels. Therefore, in developing the address compression herein, care was taken to ensure that the number of total/possible virtual channels per path can be configured in a path-by-path basis independent of other paths or ATM structures.

Another consideration is that in some cases a single ATM layer is needed to support multiple physical links. In this case, the mapping/compression process is multiplied by the number of supported physical links. Therefore, the number of bits in a compressed VPI will have to vary between links since different links will require different numbers of virtual paths. For example, one ATM layer may have 4 physical links wherein each physical link has a different number of virtual paths wherein each virtual path may have a vastly different number of virtual channels when compared to other paths. Therefore, the address compression should be efficient but must also be flexible to allow for these wide size differentials in an ATM system.

The following discloses a method and data structure for compressing VPI and VCI bits in a manner consistent with the remarks above while keeping the number of entries in all pointer and switching/control tables small and manageable.

Illustrated in FIG. 1 is a typical asynchronous transfer mode (ATM) data cell 10. ATM data cell 10 is a 53-byte long stream of byte or binary information. Current standards communicate ATM data cell in an 8-bit (i.e., byte wide) format although any size bus (such as 16-bit, 24-bit, 32-bit, etc.) can be used for transferring ATM data cells. A physical identifier (PHY ID) 14 or link identifier (link ID) 14 is transmitted prior to the sending of an ATM data cell. Following the PHY ID 14, four header bytes 12 labeled Header 1 through Header 4 are transmitted. The four header bytes 12 contain the virtual path identifier (VPI) and the virtual channel identifier (VCI) discussed above along with other ATM information. A check redundancy code (CRC) 16 is transmitted following the header bytes 12. The CRC is also referred to in the ATM protocol as being a header error check (HEC). The CRC 16 contains information which allows an ATM entity to determine if the contents of the four header bytes 14 was transmitted correctly or contains errors and can give an ATM entity the ability to correct some transmission errors due to noise, etc.. After the CRC 16, a 48-byte data payload is transmitted one byte at a time (in the standard ATM system). In a typical system several of these 53-byte data cells along with PHY IDs are serially transmitted via a bus in order to communicate ATM information from one point to another point.

Figure 2:
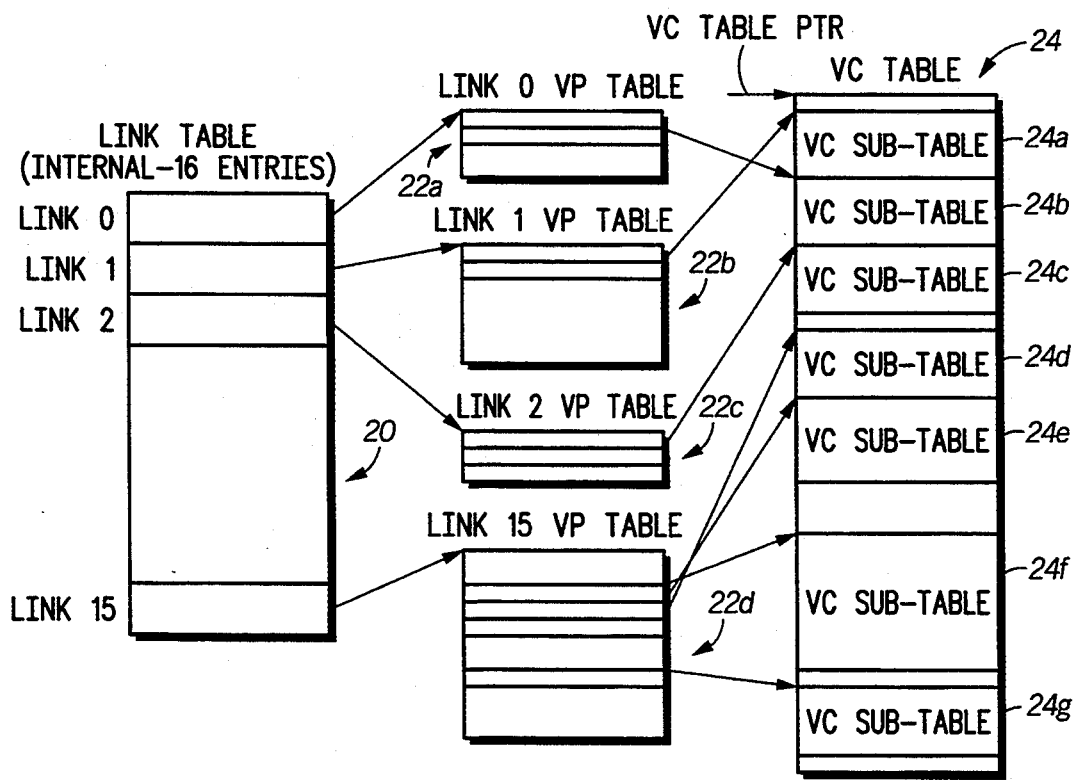
FIG. 2 illustrates, in a block diagram, an asynchronous transfer mode (ATM) address compression data structure in accordance with the present invention.

FIG. 2 illustrates a typical address compression data structure which can be used to reduce VPI and VCI sizes. Generally, FIG. 2 illustrates a link table 20 which has sixteen entries in FIG. 2. It should be noted that any number of entries can be placed into the link table and sixteen entries are used herein for illustration and are used due to the fact that sixteen link entries are optimal for current ATM applications. Each entry in the link table 20 contains a link enable bit, an address compression mode (ACM) field, a virtual path mask and a virtual path pointer which are illustrated in further detail in FIG. 3.

In FIG. 2, each link entry in the link table 20 addresses or "points to" a Virtual path table or a VP table. In FIG. 2, four of the possible sixteen VP tables are illustrated via VP tables 22a through 22d. Each VP table 22a–22d has a plurality of entries wherein each VP table 22a–22d may have a different number or a same number of entries depending upon the application. In FIG. 2, the VP tables 22b and 22d are shown to have more entries than VP tables 22a and 22c, and table 22c is the smallest-sized table. Each VP table contains at least one of at least two possible types of entries. These entries are discussed in FIG. 3. In general, each VP entry in the VP tables either: (1) provides an ingress connection identifier (ICI) (if the path has no connections); or (2) provides addressing to a ingress connection/channel identifier (ICI) in a virtual channel entry of a virtual channel table. In general, VP tables do not have to be in any order in memory and may be separated and segmented throughout memory. In addition, each of the VP tables may be in a o completely different block of memory and do not have to be confined to a particular region or memory or a contiguous block of memory.

The ICI is the final result of the address compression process which is used to access connection-related parameters and flags in external memory to allow communication of an ATM data cell. In an ATM system, ingress is analogous to receive and egress is analogous to transmit.

In FIG. 2, each entry in the VP tables which does not provide an ingress connection identifier (ICI) provides an index, address, vector, or pointer to a virtual channel table (VC table) in memory. Unlike the VP tables, the VC tables 24 in FIG. 2 are all identified via a predetermined virtual channel table pointer (VC table PTR)plus an offset address supplied by the VP table entry. Therefore, VC tables 24 are addressed differently from VP tables and are usually semi-contiguous in memory as indicated in FIG. 2. The VC table pointer (which is a base address) is added to the index provided by a VP entry to address a VC sub-table 24a–24g in the VC table 24. Each virtual path from the VP table entry may have zero to thousands of virtual channels stored in a sub-array of the VC table 24. In FIG. 2, it is illustrated that the VC sub-tables 24a–24g can vary in number of entries or size. A VC sub-table entry provides one or more ingress connection identifiers (ICIs) which may be used to physically route data through an ATM system. The exact structure of a VC sub-table is discussed in FIG. 3.

Figure 3:
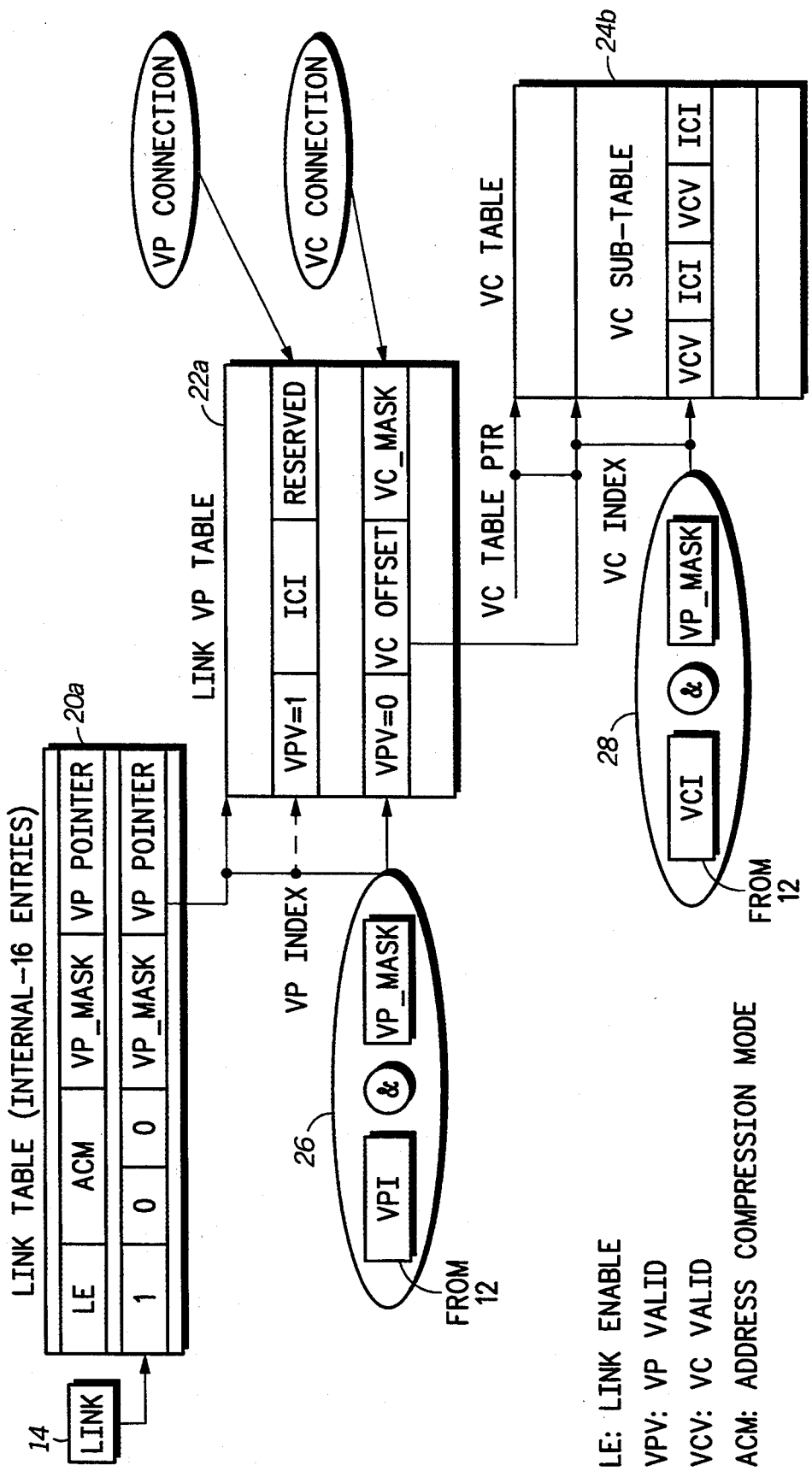
FIG. 3 illustrates, in a block diagram, a more detailed view of a portion of the asynchronous transfer mode (ATM) address compression structure FIG. 2.

FIG. 3 illustrates in more exact detail the structure illustrated in FIG. 2. FIG. 3 illustrates a single link table entry 20a which is a portion of the link table 20 of FIG. 2. To address an entry in the link table 20 (such as entry 20a) the PHY ID 14 (introduced in FIG. 1 and the PHY ID is the same as the link) is used as illustrated in FIG. 3. The PHY ID 14 identifies one entry in the link table which in FIG. 3 is entry 20a. Entry 20a comprises a link enable (LE) bit. If the LE bit is asserted then the following entry information is accurate and usable. If the LE bit is deasserted, then the entry is invalid and the handling of this condition varies with the application. The entry 20a contains an address compression mode (ACM) field which is illustrated as being two bits in length in FIG. 3. It should be noted that any size ACM can be used and if there is only one ACM mode supported, then this field may be removed from the link table. The two-bit ACM of FIG. 3 allows for four different addressing modes, some of which as discussed herein is subsequent figures.

Figure 4:
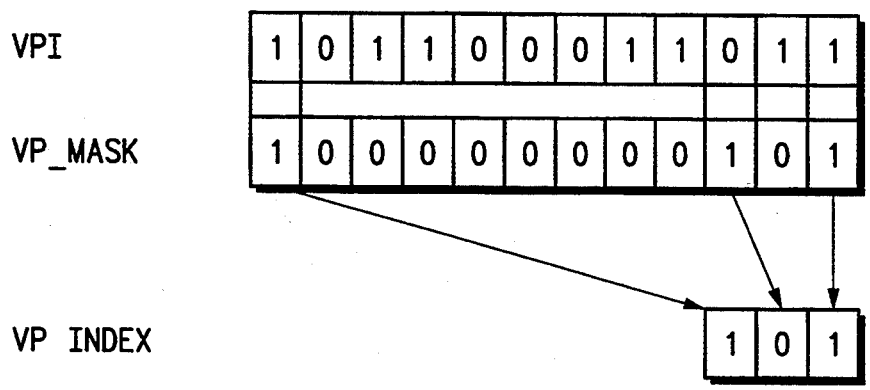
FIG. 4 illustrates, in a block diagram, an asynchronous transfer mode (ATM) address compression example in accordance with the present invention.

The link entry 20a also contains a virtual path mask (VP mask) which is used to reduce the number of bits via logical operations and shift operations which are illustrated in FIG. 4 resulting in a reduced VP address. This reduced VP address is used to index into a VP table as illustrated in FIGS. 2 and 3. The entry 20a also contains a virtual path pointer (VP pointer) which is used to identify or address the beginning of the corresponding VP table as illustrated.

In FIG. 3, the VP pointer of entry 20a identifies (for example) the VP table 22a of FIG. 2 which is illustrated in detail in FIG. 3. The virtual path identifier (VPI) (which is provided via the header bytes 12 which were introduced in FIG. 1) is logically combined with the VP mask from entry 20a to determine a compressed or reduce VP index into the table 22a as illustrated FIG. computation 26. Once again, an example of the computation 26 is given in FIG. 4. FIG. 3 illustrates two possible entries which may be accessed via the VP pointer plus the VP index (which is found by the operation of FIG. 4 performed on the VPI and the VP mask).

The first entry which may be accessed via the VP index and the VP pointer is an entry wherein the virtual path has no virtual channels and instead of passing data via a channel in a path, the entire path is the data connection/channel. In this case, no vital channel identification or information is needed and the VP table entry contains a VP valid (VPV) bit and the ingress connection identifier (ICI). The VPV bit is asserted when the entry is valid path with no channels and is deasserted if the entry is a valid path with multiple channels. This situation can be looked at in one of several manner: (1) the virtual path and the virtual channel are the same or (2) the virtual path has only one virtual channel, etc.

The other possible entry which could be encountered in FIG. 3 is an entry wherein the virtual path identified by the entry has more than one virtual channel. In this cases, virtual channel information is stored by the VP table entry as illustrated in FIG. 3. This entry will contain a VPV bit (discussed above), a virtual channel offset (VC offset) and a virtual channel mask (VC mask). The VC offset is added to the fixed VC table PTR to find a particular VC sub-table in the VC table 24 of FIG. 2. In accordance with FIG. 2 and for the sake of example, the VP entry in FIG. 3 is illustrated as accessing VC table 24b. Once the VC sub-table is identified via the VC offset and the VC table pointer (VC table PTR), a VC entry in the subtable is addressed by logically combining the VCI (from the header bytes 12 in FIG. 1) with the VC mask. This logical combining of the VC mask with the VCI is analogous to the operation of FIG. 4 although another compression technique may be used for the VPI and the VCI. In order to more efficiently use memory, each entry in a VC sub table contains two VCV (virtual channel valid bits) corresponding respectively to two ingress connection identifiers (ICIs). In a preferred form, the first ICI is used if the VC index (formed by logically combining the VCI and the VC mask via the computation 28) is even and the second ICI is used if the VC index is odd or vice versa. In another form, only one ICI value or more than two ICI values may be stored per VC table entry. In all cases, the address compression ends with the identification of an ICI or the encountering of an invalid link, path, or connection.

FIG. 4 illustrates how a VPI from the header bytes 12 is compressed with the VP mask of FIG. 3 to form the VP index. The method of FIG. 4 is also analogous to the process used to find the VC index of FIG. 3 from the VC mask and the VCI. In FIG. 4, the VPI is logically ANDed with the VP mask. In FIG. 4 the ANDing of the VPI and the VP mask results in a 10000000001wherein the underlined bits indicate a logic one position of the VP mask. These logic one positions of the VP mask are logically shifted right (from left to right) to occupy the lowest untilled least significant bit (LSB) position to form the VP index as illustrated in FIG. 4 and used in FIG. 3. In another form, it is not necessary to perform a logical AND operations between the VP or VC mask and the VPI or VCI respectively. In another form, the selected bits in the VPI (identified by the mask) are selected/accessed and shifted right into a compact field which does not include non-selected bits.

In FIG. 3, the address compression mode (ACM) two-bit field was equal to a 00 and illustrated one possible address compression mode. Other address compression modes are illustrated in FIGS. 5 and 6.

Figure 5:
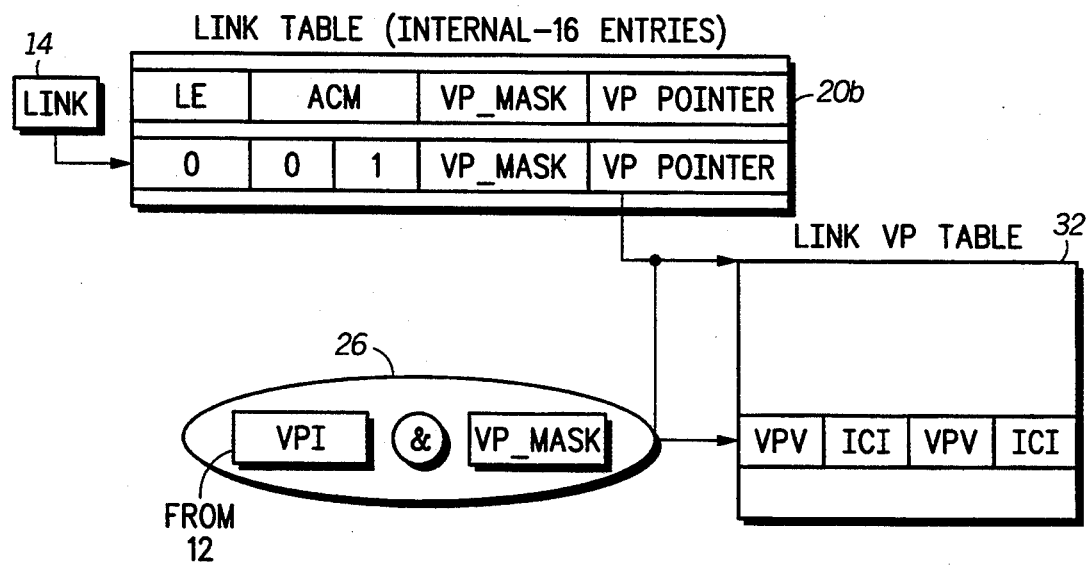
FIGS. 5–6 each illustrate, in a block diagram, a different address compression mode (ACM) for use in an asynchronous transfer mode (ATM) system, the different address compression modes (ACMs) being in accordance with the present invention.

In FIG. 5, the ACM two-bit field is equal to a 01 in a link table entry 20b. Some numerals and elements of FIG. 5 which are analogous to numerals or elements in FIG. 3 are identically labeled. In this mode, the VP table entry of VP table 32 is configured in a manner similar to the VC table entry of FIG. 3. In this mode, the VP table can contain twice as much ICI information for configurations wherein virtual connections are unlikely to be used frequently or wherein no virtual channel connections are used.

Figure 6:
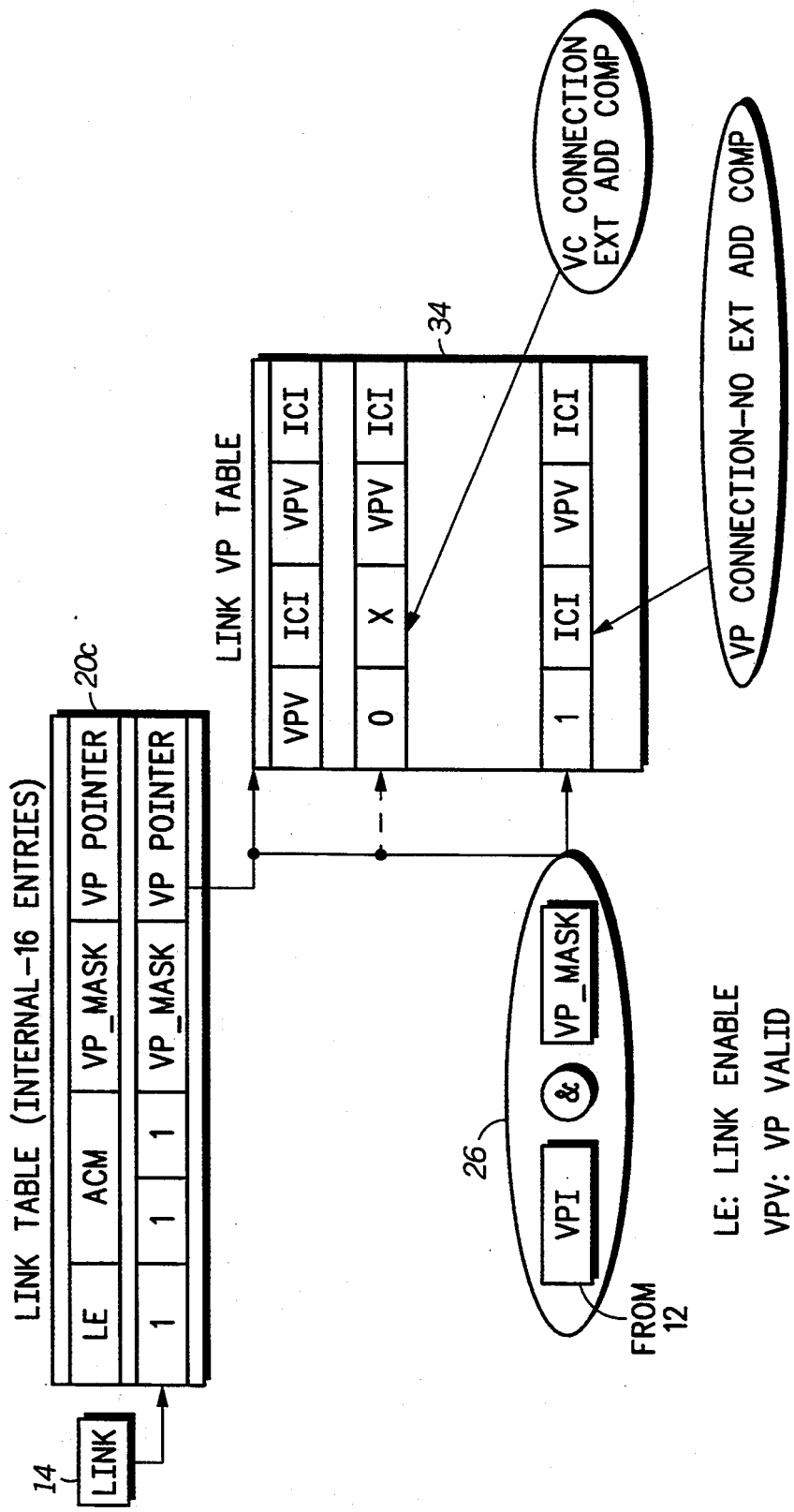

In FIG. 6, the ACM bits are set to 11 to indicate a new address compression mode. In FIG. 6, the ACM=11 indicates that the VP table can contain one of two possible entries. A first possible entry is the entry discussed in FIG. 5 wherein one VP table entry contains two ICI values and two corresponding VP valid (VPV) bits. A second possible entry is an entry wherein the VPV is deasserted and the location which typically stored an ICI value stores information to access an external address compression method for the virtual connection. This allows flexibility so that a user can externally provide a customized address compression technique in memory to compress bits into a VC index or determine an ICI value. Usually, this external VC compression uses a content addressable memory (CAM). Typically, this mode is used for a system which uses many virtual paths wherein each virtual path has only a few virtual channels.

While the present invention has been illustrated and described with reference to specific embodiments, further modifications and improvements will occur to those skilled in the art. For example, bus sizes for ATM may vary and the control signals, data payload, header information, CRC and like information can be altered or new bytes/bits added to an ATM data cell or proceed an ATM data cell. Several other ACM values may be added so that other address compression modes can be used. The structure of the VP, VC, and link tables herein may be changed in bit width or size depending upon the ATM application. The, compression taught herein may be used for other communication protocols or serial transfer techniques other than ATM. The VC and VP tables may be structured in another data structure using arrays, block allocation of memory, linked lists, hashing, and like data storage techniques. It is important to note that plurality, as used herein, is intended to mean any number of elements which is more than one raging from two to theoretically infinite elements. The term plurality should not be limited to any particular constant or sub-range within the range two through infinity. Note, that the term virtual connection is intended to be a general term that includes virtual paths or virtual path connections and virtual channels or virtual channel connections herein. The use of channels and connections herein is sometimes synonymous and may be one in the same in some applications. It is to be understood, therefore, that this invention is not limited to the particular forms illustrated and that it is intended in the appended claims to cover all modifications that do not depart from the spirit and scope of this invention.

What is claimed is:

1. A method for address compression in an asynchronous transfer mode (ATM) system, the method comprising the steps of:
   providing a serial stream of ATM bytes to an ATM system;
   extracting a physical layer identifier from the serial stream of ATM bytes;
   extracting a virtual path identifier from the serial stream of ATM bytes;
   using the physical layer identifier as an index into a plurality of entries in a link table;
   using an entry in the link table to access a selected one virtual path table out of at least one virtual path table stored in memory;
   using the virtual path identifier to index into the selected one virtual path table to identify a selected one entry in the selected one virtual path table; and
   extracting an ingress connection identifier from the selected one entry.

2. The method of claim 1 wherein the step of using an entry in the link table to access a selected one virtual path table out of at least one virtual path table stored in memory comprises:
   accessing the selected one virtual path table out of a plurality of virtual path tables wherein each virtual path table in the plurality of virtual path tables comprise N entries wherein N is a finite positive integer wherein the value of N, for each virtual path table, is numerically independent of all other N values for other virtual path tables in the plurality of virtual path tables.

3. The method of claim 1 wherein the step of using the physical layer identifier as an index into a plurality of entries in link table comprises:
   accessing the plurality of entries in the link table wherein each of the plurality of entries comprises a virtual path mask field which is used to reduce N number of bits of the virtual path identifier to M number of bits wherein M is less than N.

4. The method of claim 3 wherein the step of accessing the plurality of entries in the link table comprises:
   logically shifting all valid bits of the virtual path identifier as indicated by asserted values of the virtual path rank field to form the M number of bits which is less than N.

5. The method of claim 1 wherein the virtual path identifier is at least 12 bits in length.

6. The method of claim 1 wherein the step of using the virtual path identifier to index into the selected one virtual path table to identify a selected one entry in the selected one virtual path table comprises:
   providing with each entry in the selected one virtual table path a virtual path valid bit wherein the virtual path valid bit is asserted if a corresponding entry is valid and is deasserted if the corresponding entry invalid.

7. The method of claim 1 wherein the step of using the physical layer identifier as an index into a plurality of entries in a link table comprises:
   providing the link table wherein each entry of the link table comprises a link enable bit, an address compression mode identifier, a virtual path mask for reducing a number of bits in the virtual path identifier, and a virtual path pointer for addressing the selected one virtual path table out of at least one virtual path table stored in memory.

8. A method for address compression in an asynchronous transfer mode (ATM) system, the method comprising the steps of:
- providing a serial stream of ATM bytes to an ATM system;
- extracting a physical layer identifier from the serial stream of ATM bytes;
- extracting a virtual path identifier from the serial stream of ATM bytes;
- extracting a virtual channel identifier from the serial stream of ATM bytes;
- using the physical layer identifier as an index into a plurality of entries in a link table;
- using an entry in the link table to access a selected one virtual path table out of a plurality of virtual path tables stored in memory;
- using the virtual path identifier to index into the selected one virtual path table to identify a selected one entry in the selected one virtual path table;
- extracting a virtual channel offset from the selected one entry;
- using the virtual channel offset and the virtual channel identifier to access a selected one virtual channel table entry in a selected one virtual channel table out of a plurality of virtual channel tables; and
- extracting an ingress connection identifier from the selected one selected one virtual channel table entry.

9. The method of claim 8 wherein the step of using an entry in the link table to access a selected one virtual path table out of a plurality of virtual path table stored in memory comprises:
- providing a virtual path table which contains two possible entries wherein a first possible entry comprises a virtual path valid bit, and an ingress connection identifier field, a second possible entry comprising a virtual path valid bit, a virtual channel offset field for addressing the selected one virtual channel table out of a plurality of virtual channel tables, and a virtual channel mask field for reducing a number of bits in the virtual channel identifier.

10. The method of claim 8 wherein the step of extracting a virtual channel identifier from the serial stream of ATM bytes comprises:
- extracting the virtual channel identifier as at least a 16-bit value.

11. The method of claim 8 wherein the step of using the virtual channel offset and the virtual channel identifier to access a selected one virtual channel table entry comprises:
- providing in the selected one virtual channel table entry in the selected one virtual channel table at least one virtual channel valid bit.

12. The method of claim 8, wherein the step of using the virtual channel offset and the virtual channel identifier to access a selected one virtual channel table entry comprises:
- providing in the selected one virtual channel table entry in the selected one virtual channel table a first virtual channel valid bit corresponding to a first ingress connection identifier, and a second virtual channel valid bit corresponding to a second ingress connection identifier.

13. The method of claim 8 wherein the step of using the virtual channel offset and the virtual channel identifier to access a selected one virtual channel table entry comprises:
- providing in the selected one virtual channel table entry in the selected one virtual channel table a plurality of ingress connection identifiers wherein the ingress connection identifier is selected from the plurality of ingress connection identifiers.

14. The method of claim 8 wherein the step of using the virtual path identifier to index into the selected one virtual path table comprises:
- providing a virtual channel mask value in the selected one entry in the selected one virtual path table wherein the virtual channel mask value is used to reduce a number of bits of the virtual channel identifier.

15. The method of claim 8 wherein the step of using the virtual path identifier to index into the selected one virtual path table comprises:
- accessing the selected one entry in the selected one virtual path table in the virtual path table wherein the selected one entry in the selected one virtual path table comprises a virtual channel mask field which is used to reduce N number of bits of the virtual channel identifier to M number of bits wherein M is less than N.

16. The method of claim 15 wherein the step of accessing the selected one entry in the selected one virtual path table comprises:
- logically shifting right all valid bits of the virtual channel identifier as indicated by asserted values in the virtual channel mask field to form the M number of bits which is less than N.

17. A method for address compression in an asynchronous transfer mode (ATM) system, the method comprising the steps of:
- providing a link identifier to an ATM system; providing a virtual path identifier to the ATM system;
- using the link identifier to access one link table entry in a link table, the link table entry comprising a virtual path mask and a virtual path pointer;
- using the virtual path pointer to access one virtual path table out of a plurality of virtual path tables;
- forming a virtual path index by masking the virtual path identifier with the virtual path mask;
- using the virtual path index to access a selected virtual path entry in the one virtual path table; and
- accessing an ingress connection identifier by using the selected virtual path entry.

18. The method of claim 17 wherein the step of accessing an ingress connection identifier from the selected virtual path entry comprises:
- reading the ingress connection identifier out of the selected virtual path entry.

19. The method of claim 17 wherein the step of accessing an ingress connection identifier from the selected virtual path entry comprises:
- providing a virtual channel identifier to the ATM system;
- accessing a virtual channel mask in the selected virtual path entry;
- logically combining the virtual channel identifier and the virtual channel mask to form a reduced value; and
- using the reduced value to access a table which contains the ingress connection identifier.

20. The method of claim 17 wherein the step of using the link identifier to access one link table entry in a link table comprises:

storing in the one link table entry in a link table an address compression mode (ACM) field and a link enable bit.

21. A method for address compression in an asynchronous transfer mode (ATM) system, the method comprising the steps of:

providing a link identifier to an ATM system;

providing a virtual path identifier to the ATM system;

providing a virtual channel identifier to the ATM system; using the link identifier to access one link table entry in a link table, the link table entry comprising a virtual path mask and a virtual path pointer;

using the virtual path pointer to access one virtual path table out of a plurality of virtual path tables;

forming a virtual path index by masking the virtual path identifier with the virtual path mask;

using the virtual path index to access a selected virtual path entry in the one virtual path table, the selected virtual path entry comprising a virtual channel pointer and a virtual channel mask;

using the virtual channel pointer to access one virtual channel table out of a plurality of virtual channel tables;

forming a virtual channel index by masking the virtual channel identifier with the virtual channel mask; and using the virtual channel index to access a selected virtual channel entry in the one virtual channel table, the selected virtual channel entry comprising a selected ingress connection identifier in the selected virtual channel entry.

22. The method of claim 21 wherein the step of using the link identifier to access one link table entry in a link table comprises:

storing in the one link table entry in a link table an address compression mode (ACM) field and a link enable bit.

23. The method of claim 21 wherein the step of using the virtual channel index to access a selected virtual channel entry comprises:

accessing one ingress connection identifier out of a plurality of ingress connection identifiers stored in the selected virtual channel entry.

24. A data structure for performing address compression in an asynchronous transfer mode (ATM) system, the data structure comprising:

a link array, the link array containing a plurality of entries wherein one of the entries is accessed for each incoming ATM data cell, each entry in the plurality of entries comprising a virtual path pointer;

a plurality of virtual path tables wherein each virtual path pointer in the link array is used to address a unique one virtual path table in the plurality of virtual path tables, each virtual path table in the plurality of virtual path tables comprising at least one virtual path entry, the at least one virtual path entry comprising a virtual channel pointer; and a plurality of virtual channel tables wherein each virtual channel pointer in the plurality of virtual path tables is used to address a unique one virtual channel table in the plurality of virtual channel tables, the unique one virtual channel table comprising a plurality of entries wherein one of the entries in the plurality of entries comprises an ingress connection identifier for routing ATM data in the asynchronous transfer mode (ATM) system.

25. A data structure for performing address compression in an asynchronous transfer mode (ATM) system, the data structure comprising:

a link data structure, the link data structure containing a plurality of entries wherein one of the entries is accessed for each incoming ATM data cell, each entry in the plurality of entries comprising a virtual path pointer;

a plurality of virtual path tables wherein each virtual path pointer in the link array is used to address one virtual path table in the plurality of virtual path tables, each virtual path table in the plurality of virtual path tables comprising an ingress connection identifier (ICI) for routing ATM data in the asynchronous transfer mode (ATM) system.

* * * * *